(12) United States Patent
Lu et al.

(10) Patent No.: US 10,907,083 B2
(45) Date of Patent: Feb. 2, 2021

(54) POLYMER SYSTEM FOR FLUID LOSS CONTROL

(71) Applicant: CNPC USA CORPORATION, Houston, TX (US)

(72) Inventors: Meng Lu, Sugar Land, TX (US); Ping Huang, Chengdu (CN); Wei Wan, Chengdu (CN)

(73) Assignee: CNPC USA Corporation, Houston, TX (US)

(*) Notice: Subject to any disclaimer, the term of this patent is extended or adjusted under 35 U.S.C. 154(b) by 0 days.

(21) Appl. No.: 16/402,639

(22) Filed: May 3, 2019

(65) Prior Publication Data

US 2019/0256759 A1 Aug. 22, 2019

Related U.S. Application Data

(62) Division of application No. 15/228,823, filed on Aug. 4, 2016, now Pat. No. 10,280,354.

(51) Int. Cl.
| | | |
|---|---|---|
| *C09K 8/12* | (2006.01) | |
| *C08L 33/26* | (2006.01) | |
| *C08L 41/00* | (2006.01) | |
| *C09K 8/035* | (2006.01) | |
| *C09K 8/508* | (2006.01) | |
| *C09K 8/512* | (2006.01) | |

(52) U.S. Cl.
CPC ............... *C09K 8/12* (2013.01); *C08L 33/26* (2013.01); *C08L 41/00* (2013.01); *C09K 8/035* (2013.01); *C09K 8/508* (2013.01); *C09K 8/512* (2013.01)

(58) Field of Classification Search
None
See application file for complete search history.

(56) References Cited

U.S. PATENT DOCUMENTS 5,465,792 A * 11/1995 Dawson ................ C09K 8/512
166/294

* cited by examiner

*Primary Examiner* — John J Figueroa
(74) *Attorney, Agent, or Firm* — Ramey & Schwaller, LLP; William P. Ramey; Melissa D. Schwaller

(57) ABSTRACT

A combination of three polymers including a crosslinked acrylamide-TBAS copolymers in inverse emulsion form, N-vinyl pyrrolidone-acrylamide-TBAS terpolymer, and crosslinked N-vinyl pyrrolidone-acrylamide-TBAS acts as high temperature, high pressure fluid loss control additives for water-based drilling fluids systems. The combination is particularly useful for high salt, high density drilling fluids, and high temperature applications.

8 Claims, No Drawings

POLYMER SYSTEM FOR FLUID LOSS CONTROL

RELATED APPLICATIONS

This application is a divisional application of U.S. patent application Ser. No. 15/228,823 filed on Aug. 4, 2016, U.S. Pat. No. 10,280,354, to issue May 7, 2019; which is specifically incorporated by reference in its entirety herein.

FIELD

The disclosure relates generally to oil production. The disclosure relates specifically to water-based drilling fluids.

BACKGROUND

Fluid loss control or filtration control is an important property of drilling fluids. One type of fluid loss control additive used in water-based drilling fluids is water soluble polymers, particularly 2-acrylamide-2-methylpropanesulfonic acid (also known as TBAS) and/or N-vinyl pyrrolidone (NVP) comprising polymers that can be used for high pressure, high temperature applications. However, in drilling fluids with high salinity, i.e. the Cl⁻ concentration is 150,000 mg/L to 180,000 mg/L, a single polymer does not provide good fluid loss control at high temperature (over 300° F.) and high pressure in high density (15 ppg or higher).

It would be advantageous to have high performance water-based drilling fluids with improved fluid loss or filtration control, particularly in drilling fluids for high temperature, high pressure, high salt concentration, and/or high density applications.

SUMMARY

An embodiment of the disclosure is a composition for fluid loss control comprising a first polymer comprising a acrylamide-NVP-2-acrylamide-2-methylpropanesulfonic acid terpolymer comprising an acrylamide monomer at 30-80%, a 2-acrylamide-2-methylpropanesulfonic acid monomer at 10-50%; and a NVP monomer at 5-30%; a second polymer comprising a crosslinked acrylamide-NVP-2-acrylamide-2-methylpropanesulfonic acid terpolymer comprising an acrylamide monomer at 30-80%, a 2-acrylamide-2-methylpropanesulfonic acid monomer at 10-50%, an NVP monomer at 5-20%, and a crosslinking monomer at 0.05%-0.5%; and a third polymer comprising a crosslinked acrylamide-2-acrylamide-2-methylpropanesulfonic acid copolymer in inverse emulsion comprising an acrylamide monomer at 30-80%, a 2-acrylamide-2-methylpropanesulfonic acid monomer at 20-70%, and a crosslinking monomer at 0.1-1%.

In an embodiment, the first polymer comprises an acrylamide-NVP-2-acrylamide-2-methylpropanesulfonic acid terpolymer comprising an acrylamide monomer at 40-60%, a 2-acrylamide-2-methylpropanesulfonic acid monomer at 25-40%; and a NVP monomer at 10-20%.

In an embodiment, the second polymer comprises a crosslinked acrylamide-NVP-2-acrylamide-2-methylpropanesulfonic acid terpolymer comprising an acrylamide monomer at 40-60%, a 2-acrylamide-2-methylpropanesulfonic acid monomer at 25-40%, an NVP monomer at 10-20%, and a crosslinking monomer at 0.1-0.3%.

In an embodiment, the third polymer comprises a crosslinked acrylamide-2-acrylamide-2-methylpropanesulfonic acid copolymer in inverse emulsion comprising an acrylamide monomer at 40-60%, a 2-acrylamide-2-methylpropanesulfonic acid monomer at 40-50%, and a crosslinking monomer at 0.3-0.6%.

In an embodiment, the first polymer comprises an acrylamide-NVP-2-acrylamide-2-methylpropanesulfonic acid terpolymer comprising an acrylamide monomer at 40-60%, a 2-acrylamide-2-methylpropanesulfonic acid monomer at 25-40%; and a NVP monomer at 10-20%; the second polymer comprising a crosslinked acrylamide-NVP-2-acrylamide-2-methylpropanesulfonic acid terpolymer comprising an acrylamide monomer at 40-60%, a 2-acrylamide-2-methylpropanesulfonic acid monomer at 25-40%, an NVP monomer at 10-20%, and a crosslinking monomer 0.1-0.3%; and the third polymer comprising a crosslinked acrylamide-2-acrylamide-2-methylpropanesulfonic acid copolymer in inverse emulsion comprising an acrylamide monomer at 40-60%, a 2-acrylamide-2-methylpropanesulfonic acid monomer at 40-50%, and a crosslinking monomer at 0.3-0.6%.

In an embodiment, the composition comprises 1-4 ppb of the first polymer, 2-6 ppb of the second polymer, and 1-4 ppb of the third polymer. In an embodiment, the composition comprises 1-4 ppb of the first polymer A, 1-4 ppb of the second polymer, and 1-4 ppb of the third polymer. In an embodiment, the composition comprises 1-4 ppb of the first polymer, 2-4 ppb of the second polymer, and 2-4 ppb of the third polymer.

An embodiment of the disclosure is a system for fluid loss control comprising a water-based drilling fluid comprising a first polymer comprising a acrylamide-NVP-2-acrylamide-2-methylpropanesulfonic acid terpolymer comprising an acrylamide monomer at 30-80%, a 2-acrylamide-2-methylpropanesulfonic acid monomer at 10-50% and a NVP monomer at 5-30%; a second polymer comprising a crosslinked acrylamide-NVP-2-acrylamide-2-methylpropanesulfonic acid terpolymer comprising an acrylamide monomer at 30-80%, a 2-acrylamide-2-methylpropanesulfonic acid monomer 10-50%, an NVP monomer at 5-20%, and a crosslinking monomer at 0.05%-0.5%; and a third polymer comprising a crosslinked acrylamide-2-acrylamide-2-methylpropanesulfonic acid copolymer in inverse emulsion comprising an acrylamide monomer at 30-80%, a 2-acrylamide-2-methylpropanesulfonic acid monomer at 20-70%, and a crosslinking monomer at 0.1-1%.

In an embodiment, the water-based drilling fluid has a salt concentration between about 150,000 mg/L and 190,000 mg/L. In an embodiment, the water-based drilling fluid is utilized at or above 300° F. In an embodiment, the water-based drilling fluid is utilized at or above 15 ppg.

An embodiment of the disclosure is a method for controlling fluid loss while drilling a wellbore comprising using a water-based drilling fluid comprising a first polymer comprising a acrylamide-NVP-2-acrylamide-2-methylpropanesulfonic acid terpolymer comprising an acrylamide monomer at 30-80%, a 2-acrylamide-2-methylpropanesulfonic acid monomer at 10-50% and a NVP monomer at 5-30%; a second polymer comprising a crosslinked acrylamide-NVP-2-acrylamide-2-methylpropanesulfonic acid terpolymer comprising an acrylamide monomer at 30-80%, a 2-acrylamide-2-methylpropanesulfonic acid monomer 10-50%, an NVP monomer at 5-20%, and a crosslinking monomer at 0.05%-0.5%; and a third polymer comprising a crosslinked acrylamide-2-acrylamide-2-methylpropanesulfonic acid copolymer in inverse emulsion comprising an acrylamide monomer at 30-80%, a 2-acrylamide-2-methylpropanesulfonic acid monomer at 20-70%, and a crosslinking monomer at 0.1-1%.

In an embodiment, the first polymer comprises an acrylamide-NVP-2-acrylamide-2-methylpropanesulfonic acid terpolymer comprising an acrylamide monomer at 40-60%, a 2-acrylamide-2-methylpropanesulfonic acid monomer at 25-40%; and a NVP monomer at 10-20%.

In an embodiment, the second polymer comprises a crosslinked acrylamide-NVP-2-acrylamide-2-methylpropanesulfonic acid terpolymer comprising an acrylamide monomer at 40-60%, a 2-acrylamide-2-methylpropanesulfonic acid monomer at 25-40%, an NVP monomer at 10-20%, and a crosslinking monomer at 0.1-0.3%.

In an embodiment, the third polymer comprises a crosslinked acrylamide-2-acrylamide-2-methylpropanesulfonic acid copolymer in inverse emulsion comprising an acrylamide monomer at 40-60%, a 2-acrylamide-2-methylpropanesulfonic acid monomer at 40-50%, and a crosslinking monomer at 0.3-0.6%.

In an embodiment, the water-based drilling fluid comprises a first polymer comprising an acrylamide-NVP-2-acrylamide-2-methylpropanesulfonic acid terpolymer comprising an acrylamide monomer at 40-60%, a 2-acrylamide-2-methylpropanesulfonic acid monomer at 25-40%; and a NVP monomer at 10-20%; a second polymer comprising a crosslinked acrylamide-NVP-2-acrylamide-2-methylpropanesulfonic acid terpolymer comprising an acrylamide monomer at 40-60%, a 2-acrylamide-2-methylpropanesulfonic acid monomer at 25-40%, an NVP monomer at 10-20%, and a crosslinking monomer 0.1-0.3%; and a third polymer comprising a crosslinked acrylamide-2-acrylamide-2-methylpropanesulfonic acid copolymer in inverse emulsion comprising an acrylamide monomer at 40-60%, a 2-acrylamide-2-ethylpropanesulfonic acid monomer at 40-50%, and a crosslinking monomer at 0.3-0.6%.

In an embodiment, the water-based drilling fluid comprises 1-4 ppb of the first polymer, 2-6 ppb of the second polymer, and 1-4 ppb of the third polymer. In an embodiment, the water-based drilling fluid comprises 1-4 ppb of the first polymer A, 1-4 ppb of the second polymer, and 1-4 ppb of the third polymer. In an embodiment, the water-based drilling fluid comprises 1-4 ppb of the first polymer, 2-4 ppb of the second polymer, and 2-4 ppb of the third polymer.

The foregoing has outlined rather broadly the features of the present disclosure in order that the detailed description that follows can be better understood. Additional features and advantages of the disclosure will be described hereinafter, which form the subject of the claims.

DETAILED DESCRIPTION

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure can be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary 3rd Edition.

As used herein, the term "inverse emulsion" means and refers to hydrophilic monomers, frequently in aqueous solution, emulsified in a continuous oil phase.

A polymer system for high temperature high pressure fluid loss control in water-based drilling fluids is disclosed herein. In an embodiment, high performance water-based drilling fluids provide improved fluid loss or filtration control, particularly in drilling fluids for high temperature, high pressure, high salt concentration, and/or high density applications.

Fluid loss additives are added to a drilling fluid to maintain a consistent fluid volume in the slurry so that the properties remain within the required range. The fluid loss additives lower the volume of filtrate that passes through a filter medium.

In an embodiment, the fluid comprises the combination of three polymers including 1) a acrylamide-NVP-2-acrylamide-2-methylpropanesulfonic acid terpolymer 2) a crosslinked acrylamide-NVP-2-acrylamide-2-methylpropanesulfonic acid terpolymer, and 3) a crosslinked acrylamide-2-acrylamide-2-methylpropanesulfonic acid copolymer in inverse emulsion as a high temperature, high pressure fluid loss control additive for water-based drilling fluid systems, particularly for high salt, high density drilling fluids.

The combination of polymers provides excellent fluid loss control at high temperatures (over 300° F.) and high pressures in high density (15 ppg or higher) water-based drilling fluids comprising over 150,000 mg/L Cl$^-$. In an embodiment, the high temperature range is 300° F.-400° F. In an embodiment, the high pressure in high density range is 15 ppg-20 ppg. In an embodiment, the salinity range is 150,000 mg/L Cl$^-$-190,000 mg/L Cl$^-$. In an embodiment, the pressure range is 100 psi-500 psi.

A combination of three polymers, including a 1) an acrylamide-NVP-2-acrylamide-2-methylpropanesulfonic acid terpolymer 2) a crosslinked acrylamide-NVP-2-acrylamide-2-methylpropanesulfonic acid terpolymer, and 3) a crosslinked acrylamide-2-acrylamide-2-methylpropanesulfonic acid copolymer in inverse emulsion, provides excellent fluid loss control at 350° F. and under 500 psi pressure in water-based drilling fluids comprising 180,000 mg/L Cl$^-$.

In an embodiment, the combination of fluid loss or filtration control polymers includes
1) a acrylamide-NVP-2-acrylamide-2-methylpropanesulfonic acid terpolymer comprising
   a. acrylamide monomer 30-80%,
   b. 2-acrylamide-2-methylpropanesulfonic acid monomer 10-50% and
   c. NVP monomer 5-30%;
2) a crosslinked acrylamide-NVP-2-acrylamide-2-methylpropanesulfonic acid terpolymer comprising
   a. acrylamide monomer 30-80%,
   b. 2-acrylamide-2-methylpropanesulfonic acid monomer 10-50%,
   c. NVP monomer 5-20%, and
   d. crosslinking monomer 0.05%-0.5%.
3) a crosslinked acrylamide-2-acrylamide-2-methylpropanesulfonic acid copolymer in inverse emulsion comprising
   a. acrylamide monomer 30-80%,
   b. 2-acrylamide-2-methylpropanesulfonic acid monomer 20-70%, and
   c. crosslinking monomer 0.1-1%.

In an embodiment, the crosslinker is N, N'-methylene-bis-acrylamide (BAAm or MBA); ethylene glycol dimethacrylate (EGDMA); divinyl sulfone; diethyleneglycol diallyl ether; PEG 200 diacrylate; PEG 400 diacrylate; polymethyleneglycol diacrylate; ethyleneglycol diacrylate; and polyethyleneglycol diacrylate. The acrylamide monomer can be selected from the group consisting of Acrylamide Monomer; 4-Acryloylmorpholine; 2-Acrylamido-2-methylpropanesulfonic Acid; Acrylamide Monomer; 3-Acryloyl-2-oxazolidinone; 6-Acrylamidohexanoic Acid; N-tert-Butylacrylamide; N-(Butoxymethyl)acrylamide; Diacetone Acrylamide; N,N-Dimethylacrylamide; N-[3-(Dimethylamino)propyl]acrylamide; N,N'-(1,2-Dihydroxyethylene)bisacrylamide; N-Dodecylacrylamide; N,N-Diethylacrylamide; N,N'-Ethylenebisacrylamide; N-(2-Hydroxyethyl)acrylamide; N-Isopropylacrylamide; N-(Hydroxymethyl)acrylamide; and N-Phenylacrylamide.

In an embodiment, the combination of polymers is used as a fluid loss control or filtration control additive in high salinity water-based drilling fluids for high temperature, high pressure applications. In an embodiment, the combination of polymers provides excellent fluid loss control at high temperature (over 300° F.) and high pressure in water-based drilling fluids comprising over 150,000 mg/L Cl⁻.

EXAMPLES

Example 1

As shown in Table 1, experimental water-based drilling fluids were prepared using three polymers A, B and C.

Polymer A (first polymer) is an acrylamide-NVP-2-acrylamide-2-methylpropanesulfonic acid terpolymer comprising acrylamide monomer 50%, 2-acrylamide-2-methylpropanesulfonic acid monomer 35%, and NVP monomer 15%.

Polymer B (second polymer) is a crosslinked acrylamide-NVP-2-acrylamide-2-methylpropanesulfonic acid terpolymer comprising acrylamide monomer 50%, 2-acrylamide-2-methylpropanesulfonic acid monomer 35%, NVP monomer 15% and crosslinking monomer 0.2%.

Polymer C (third polymer) is an acrylamide-2-acrylamide-2-methylpropanesulfonic acid copolymer in inverse emulsion with 30% active polymer comprising acrylamide monomer 50%, 2-acrylamide-2-methylpropanesulfonic acid monomer 50%, and crosslinking monomer 0.5%.

Table 1 indicates the different proportions of polymer A, polymer B, and polymer C used in the composition in the three experiments.

TABLE 1

Formulation of experimental water-based drilling fluids

| Formulations | Unit | EXP 1 | EXP 2 | EXP 3 |
|---|---|---|---|---|
| Saturated NaCl Brine | ppb | 286 | 294 | 293 |
| Soda ash | ppb | 0.5 | 0.5 | 0.5 |
| Caustic Soda | ppb | 1.5 | 1.5 | 1.5 |
| Polymer A | ppb | 2 | 2 | 2 |
| Polymer B | ppb | 4 | 2 | 3 |
| Polymer C | ppb | 2 | 2 | 3 |
| Sodium Sulfate | ppb | 1.50 | 1.50 | 1.50 |
| Graphite | ppb | 4 | 4 | 4 |
| Barite | ppb | 376 | 380 | 375 |
| Xathan Gum | ppb | 0.12 | 0.15 | 0.15 |
| Sized CaCO₃ | ppb | 23 | 13 | 13 | ppb = pounds per barrel

The fluids were subjected to standard testing to determine rheological and fluid loss properties after dynamic aging at 350° F. for 16 hours following API testing procedures. The results are in Table 2.

Bridging agents including sized calcium carbonate and graphite were also added to improve the HPHT fluid loss.

The rheology of the experimental fluids can be improved by adding other additives.

TABLE 2

Properties of experimental water-based drilling fluids after aging

| Formulations | Unit | EXP 1 | EXP 2 | EXP 3 |
|---|---|---|---|---|
| Mud weight | ppb | 16.5 | 16.5 | 16.5 |
| pH before aging | | 11.8 | 11.8 | 11.8 |
| Aging temperature | ° F. | 350 | 350 | 350 |
| Aging condition | | dynamic | dynamic | dynamic |
| Aging period | hour | 16 | 16 | 16 |
| pH after aging | | 9.1 | 9.5 | 9.0 |
| Rheology | | | | |
| Temperature | ° F. | 120 | 120 | 120 |
| 600 rpm | lb/100 ft² | 191 | 196 | 193.6 |
| 300 rpm | lb/100 ft² | 108.6 | 107 | 109 |
| 200 rpm | lb/100 ft² | 78.2 | 76 | 78 |
| 100 rpm | lb/100 ft² | 45.2 | 43 | 45 |
| 6 rpm | lb/100 ft² | 5.6 | 5 | 5.4 |
| 3 rpm | lb/100 ft² | 3.4 | 3 | 32 |
| Apparent Viscosity | cp | 95.5 | 98 | 97 |
| Plastic Viscosity | cp | 82 | 86 | 80 |
| Yield Point | lb/100 ft² | 25 | 18 | 28 |
| 10 seconds gel | lb/100 ft² | 7.2 | 2.9 | 3.7 |
| 10 minute gel | lb/100 ft² | 7.9 | 5.7 | 3.1 |
| HTHP fluid loss @350° F. | mL | 13.5 | 15 | 12.5 | ppb = pounds per barrel

All of the compositions and methods disclosed and claimed herein can be made and executed without undue experimentation in light of the present disclosure. While the compositions and methods of this disclosure have been described in terms of preferred embodiments, it will be apparent to those of skill in the art that variations can be applied to the compositions and methods and in the steps or in the sequence of steps of the methods described herein without departing from the concept, spirit and scope of the disclosure. More specifically, it will be apparent that certain agents which are both chemically related can be substituted for the agents described herein while the same or similar results would be achieved. All such similar substitutes and modifications apparent to those skilled in the art are deemed to be within the spirit, scope and concept of the disclosure as defined by the appended claims.

REFERENCES

US20140124206
US20070179064
WO2004101705
US20040229775
All references are hereby incorporated by reference.
U.S. Pat. No. 4,741,843

What is claimed is:
1. A method for controlling fluid loss while drilling a wellbore comprising
   formulating a water based drilling fluid;
   injecting the water based drilling fluid into the wellbore;
   wherein the water based drilling fluid comprises a composition comprising;

a first polymer comprising a acrylamide-NVP-2-acrylamide-2-methylpropanesulfonic acid terpolymer comprising
an acrylamide monomer at 30-80%;
a 2-acrylamide-2-methylpropanesulfonic acid monomer at 10-50%; and
a NVP monomer at 5-30%;
a second polymer comprising a crosslinked acrylamide-NVP-2-acrylamide-2-methylpropanesulfonic acid terpolymer comprising
an acrylamide monomer at 30-80%;
a 2-acrylamide-2-methylpropanesulfonic acid monomer 10-50%;
an NVP monomer at 5-20%; and
a crosslinking monomer at 0.05%-0.5%; and
a third polymer comprising a crosslinked acrylamide-2-acrylamide-2-methylpropanesulfonic acid copolymer in inverse emulsion comprising
an acrylamide monomer at 30-80%;
a 2-acrylamide-2-methylpropanesulfonic acid monomer at 20-70%; and
a crosslinking monomer at 0.1-1%
wherein the composition decreases the amount of fluid loss from a water-based drilling fluid.

2. The method of claim 1 wherein the first polymer comprises an acrylamide-NVP-2-acrylamide-2-methylpropanesulfonic acid terpolymer comprising
an acrylamide monomer at 40-60%;
a 2-acrylamide-2-methylpropanesulfonic acid monomer at 25-40%; and
a NVP monomer at 10-20%.

3. The method of claim 1 wherein the second polymer comprises a crosslinked acrylamide-NVP-2-acrylamide-2-methylpropanesulfonic acid terpolymer comprising
an acrylamide monomer at 40-60%,
a 2-acrylamide-2-methylpropanesulfonic acid monomer at 25-40%;
an NVP monomer at 10-20%; and
a crosslinking monomer at 0.1-0.3%.

4. The method of claim 1 wherein the third polymer comprises a crosslinked acrylamide-2-acrylamide-2-methylpropanesulfonic acid copolymer in inverse emulsion comprising
an acrylamide monomer at 40-60%;
a 2-acrylamide-2-methylpropanesulfonic acid monomer at 40-50%; and
a crosslinking monomer at 0.3-0.6%.

5. The method of claim 1 wherein the water-based drilling fluid comprises a composition comprising
a first polymer comprising an acrylamide-NVP-2-acrylamide-2-methylpropanesulfonic acid terpolymer comprising
an acrylamide monomer at 40-60%;
a 2-acrylamide-2-methylpropanesulfonic acid monomer at 25-40%; and
a NVP monomer at 10-20%;
a second polymer comprising a crosslinked acrylamide-NVP-2-acrylamide-2-methylpropanesulfonic acid terpolymer comprising
an acrylamide monomer at 40-60%;
a 2-acrylamide-2-methylpropanesulfonic acid monomer at 25-40%;
an NVP monomer at 10-20%; and
a crosslinking monomer at 0.1-0.3%; and
a third polymer comprising a crosslinked acrylamide-2-acrylamide-2-methylpropanesulfonic acid copolymer in inverse emulsion comprising
an acrylamide monomer at 40-60%;
a 2-acrylamide-2-methylpropanesulfonic acid monomer at 40-50%; and
a crosslinking monomer at 0.3-0.6%.

6. The method of claim 1 wherein the water-based drilling fluid comprises a composition comprising 1-4 ppb of the first polymer, 2-6 ppb of the second polymer, and 1-4 ppb of the third polymer.

7. The method of claim 1 wherein the water-based drilling fluid comprises a composition comprising 1-4 ppb of the first polymer A, 1-4 ppb of the second polymer, and 1-4 ppb of the third polymer.

8. The method of claim 1 wherein the water-based drilling fluid comprises a composition comprising 1-4 ppb of the first polymer, 2-4 ppb of the second polymer, and 2-4 ppb of the third polymer.

* * * * *